United States Patent [19]

Tabata et al.

[11] Patent Number: 4,941,683
[45] Date of Patent: Jul. 17, 1990

[54] VEHICLE SEAT BELT TIGHTENING SYSTEM

[75] Inventors: Hiroshi Tabata; Shizuyo Nakao; Yoshihiko Kinoshita; Atsushi Katsuki, all of Saitama, Japan

[73] Assignee: Honda Giken Kogyo Kabushiki Kaisha, Tokyo, Japan

[21] Appl. No.: 322,269

[22] Filed: Mar. 10, 1989

[30] Foreign Application Priority Data

Mar. 11, 1988 [JP] Japan .................................. 63-57819
Mar. 21, 1988 [JP] Japan .................................. 63-66990

[51] Int. Cl.$^5$ .............................................. B60R 22/36
[52] U.S. Cl. ...................................... 280/807; 180/268
[58] Field of Search ............... 280/807, 801, 803, 806; 297/477, 480; 180/268

[56] References Cited

U.S. PATENT DOCUMENTS

| | | | |
|---|---|---|---|
| 4,603,877 | 8/1986 | Espinoza et al. | 280/807 |
| 4,616,141 | 10/1986 | Hollowell | 280/807 |
| 4,700,974 | 10/1987 | Andres et al. | 280/807 |

FOREIGN PATENT DOCUMENTS 21574 7/1978 Japan .
60-259553 12/1985 Japan .

Primary Examiner—Richard A. Bertsch
Attorney, Agent, or Firm—Armstrong, Nikaido, Marmelstein, Kubovcik & Murray

[57] ABSTRACT

A vehicle seat belt tightening system for taking up slack from a seat belt in high acceleration or deceleration condition to positively restrain a vehicle occupant but otherwise permitting the seat belt to be paid out to accommodate a movement of the vehicle occupant, comprising: a retractor unit comprising a winding spool, a seat belt tightening unit arranged at a seat belt outlet end of the retractor unit, a drive unit for selectively activating the seat belt tightening unit, and a deceleration detection unit for acting upon the seat belt tightening unit, which are integrally mounted on a common frame. Thus, the reliability of the system is improved and the installing and the servicing of the system is simplified. In particular, the operation reliability may be improved if the reverse rotation of the seat belt tightening unit is prevented by a ratchet mechanism in which a ratchet wheel received in a mutually spaced relationship in an opening provided with inner ratchet teeth and the ratchet wheel is adapted to be displaced into meshing engagement with the inner ratchet teeth of the opening when the ratchet wheel is pulled by tension from the seat belt.

18 Claims, 10 Drawing Sheets

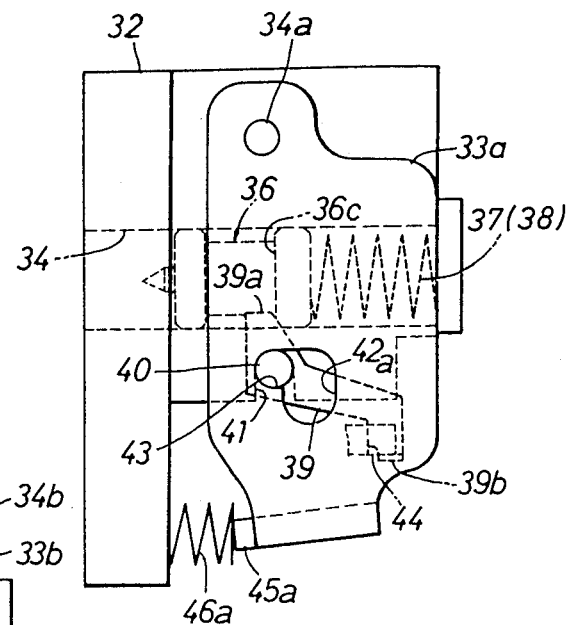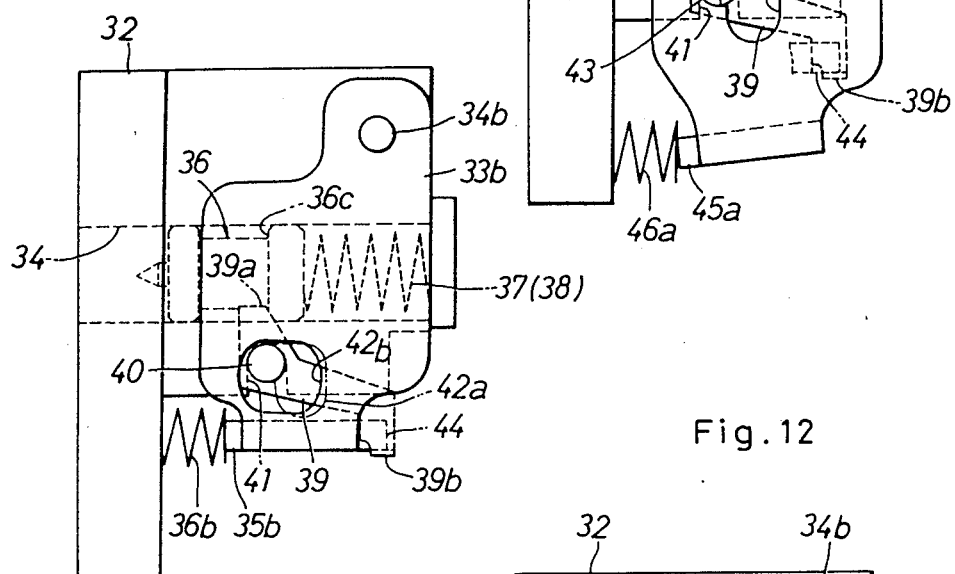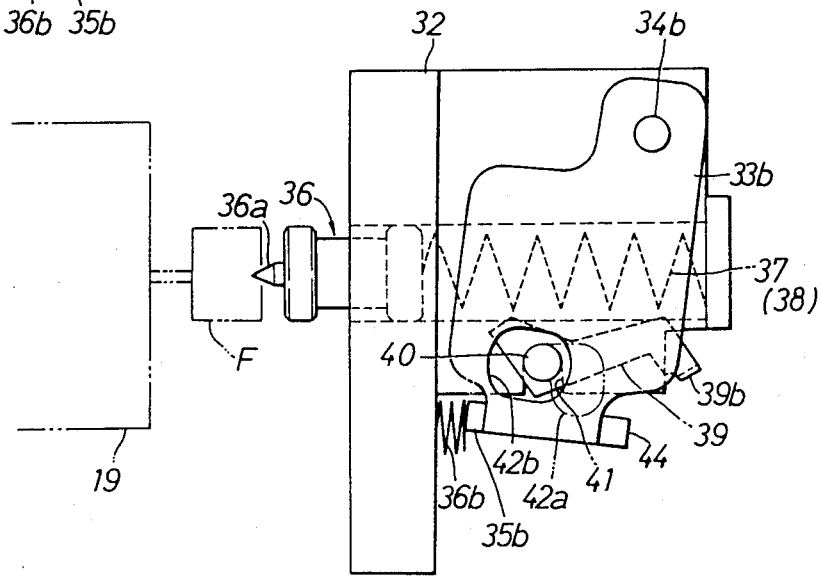

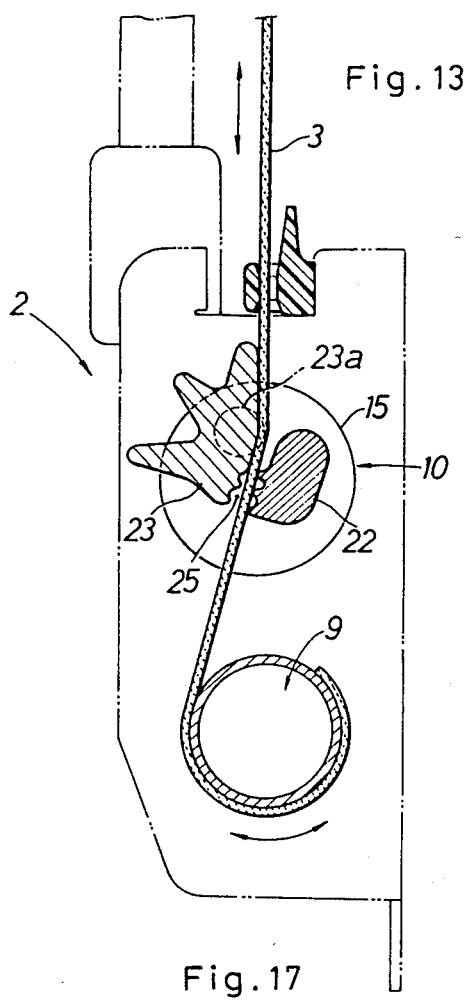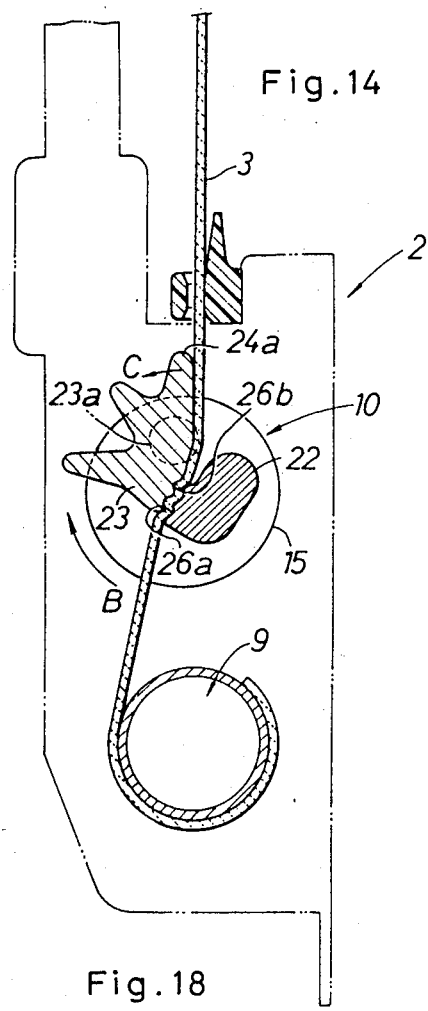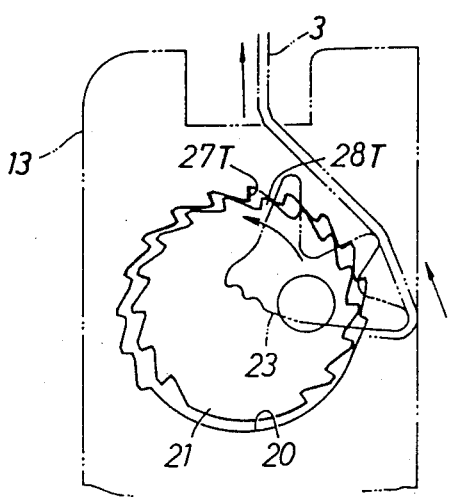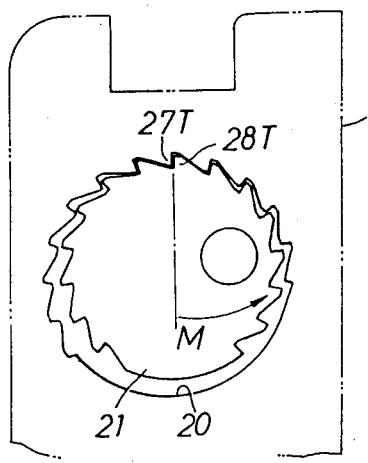

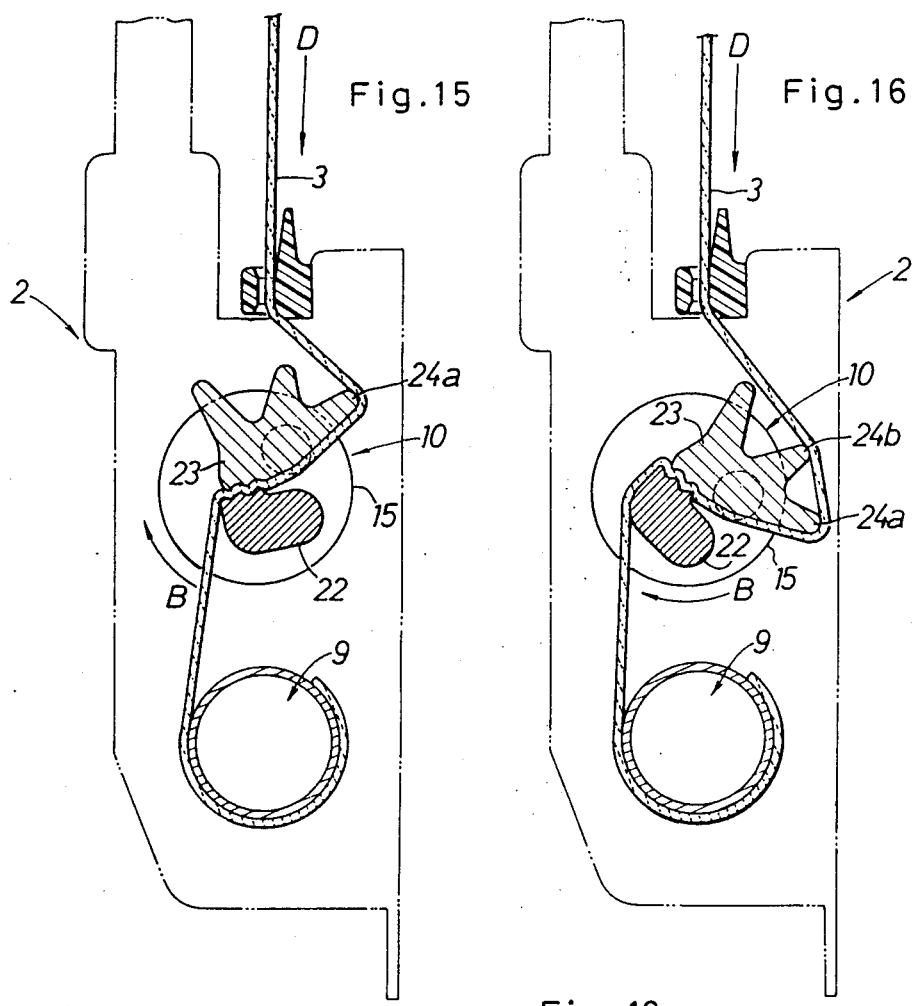
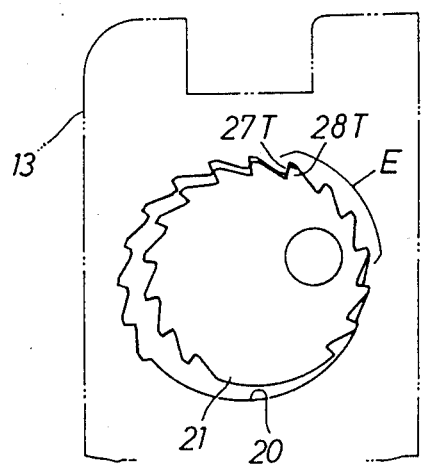

VEHICLE SEAT BELT TIGHTENING SYSTEM

TECHNICAL FIELD

The present invention relates to a seat belt tightening system for restricting the pay out of the seat belt and automatically tightening the seat belt by taking up slack therefrom in case of a vehicle crash, and in particular to such seat belt tightening device which has a highly integral and compact structure. The present invention is also related to a novel mechanism for preventing the reverse rotation of a rotary clamping mechanism which can be advantageously used in such vehicle seat belt tightening systems.

BACKGROUND OF THE INVENTION

A vehicle seat is typically equipped with a seat belt to restrain the vehicle occupant from being thrown forward in case of a vehicle crash, and such a seat belt is sometimes provided with a retractor device equipped with an emergency locking retractor (which is referred to as ELR device hereinafter) for locking the winding spool of the seat belt in case of a sudden stop or a crash, however, without restraining the movement of the occupant under normal condition.

An ELR device typically detects a deceleration level indicative of a vehicle crash or a rapid pay-out of the seat belt before it locks up the winding spool in a very short period of time. Therefore, if the amount of the slack of the seat belt in the initial stage is excessive, there is a possibility that the seat belt may be inadequate to restrain the occupant to a necessary extent.

In view of such a problem, various devices for tightening the seat belt in case of a vehicle crash or preloader devices have been proposed:

A. Structures for winding a seat belt by driving the winding spool of the ELR device (refer to Japanese utility model laid out publication No. 54-169316);

B: Structures for pulling in the end of the seat belt opposite to the ELR device end by rotating a winding spool making use of the expansion of a propellant resulting from ignition and explosion thereof (refer to Japanese patent publication No. 53-21574); and C: Structures for linearly pulling in a part of the seat belt paid out from the ELR device by coupling a clamp for gripping the seat belt to a piston which undergoes a linear displacement by the spring force of a spring or the like (refer to Japanese patent laid open publication No. 60-259553);

However, according to the structures of the categories A and B, if the seat belt is loosely wrapped around the winding spool of the ELR device, most of the power of the drive device is expended on tightly wrapping the seat belt around the winding spool and a sufficient restraint of the vehicle occupant may not be achieved.

According to the structures of the category C, a sufficient tension may be applied to the seat belt without regards to the state of the ELR device, but a relatively large displacement of moveable parts is required for linearly pulling the seat belt, and the size of the device tends to be excessively large in order to ensure a sufficient stroke of pulling the seat belt.

These ELR devices and preloaders are typically provided with a reversion preventing device consisting of a ratchet wheel and a ratchet pawl for permitting free unwinding and winding of the seat belt under normal condition and locking up the winding spool only in case of an emergency (Refer to Japanese patent publication No. 53-21574 and Japanese utility model publication No. 53-25943). However, according to such conventional arrangements, the ratchet pawl is urged into engagement with the ratchet wheel by a spring to prevent the rotation of the ratchet wheel in the reverse direction, and the reliability of such a reversion preventing device is inevitably much dependent on the elasticity of the spring which causes the necessary movement of the ratchet pawl. Therefore, the operation of the reversion preventing device is not entirely free from the chance of a failure if the ratchet pawl should be jammed or mechanically frozen.

BRIEF SUMMARY OF THE INVENTION

In view of such problems of the prior art, a primary objection of the present invention is to provide a vehicle seat belt tightening system which is highly compact requiring a minimum space for installation.

A second object of the present invention is to provide a vehicle seat belt tightening device which requires a minimum amount of power for its operation.

A third object of the present invention is to provide a vehicle seat belt tightening device which is constructed as an integral unit so as to facilitate the work required to mount it on a vehicle and servicing it.

A fourth object of the present invention is to provide a vehicle seat belt tightening device which is reliable of its operation.

These and other objects of the present invention can be accomplished by providing: a vehicle seat belt tightening system for taking up slack from a seat belt in high acceleration or deceleration condition to positively restrain a vehicle occupant but otherwise permitting the seat belt to be paid out to accommodate a movement of the vehicle occupant, comprising: retractor means having a frame and a winding spool pivotally mounted thereon for winding a seat belt thereon; seat belt tightening means integrally attached to the frame at a seat belt outlet end of the retractor means, and provided with clamping means for selectively engaging the seat belt and guide means for guiding a movement of the clamping means in a direction to take up slack from the seat belt; drive means integrally attached to the frame adjacent the seat belt tightening means for selectively activating the seat belt tightening means; and deceleration detecting means integrally attached to the frame adjacent the drive means for activating the drive means when a level of acceleration or deceleration indicative of a vehicle crash is detected.

Thus, since the part of the seat belt paid out from the retractor device is securely gripped by the seat belt tightening means, a desired tension can be applied only to the part of the seat belt which is passed around the body of the vehicle occupant and, thereby, the power from the drive means is efficiently utilized to restrain the vehicle occupant. Further, by arranging the retractor means and the seat belt tightening means adjacent to each other along the seat belt, and integrally providing the drive means and the deceleration detecting means thereto at the same time, the overall size of the system can be significantly reduced.

Furthermore, by converting a linear pulling force of the piston produced by the propellant into a rotary force by means of a pulley and a wire, the expansion of the propellant can be efficiently applied to the piston with a high sealing capability, and an efficient magnification of force is made possible.

A particularly favorable structure may be obtained if the frame comprises a pair of opposing walls for pivotally supporting two lateral ends of the winding spool, the fixed and moveable clamp members being located between the two walls and the pulley being located externally of one of the walls.

To ensure the operation reliability of the system, it is desirable if the clamping means is further provided with ratchet means for preventing rotation of the clamping means in a direction to release the clamping means. A particularly favorable result can be obtained if the ratchet means comprises a fixed engagement member fixedly secured to the frame, a moveable engagement member attached to the base member so as to be moveable in radial direction at least after the clamping means has been brought into its operative condition, the engagement members being provided with teeth which are adapted to be brought into mutual meshing engagement when the moveable engagement member is moved in the radial direction by a tension from the part of the seat belt external to the seat belt tightening system and turned in the direction to pay out the seat belt and which are adapted to be brought out of engagement when the moveable engagement member is turned in the direction to take up slack from the part of the seat belt external to the seat belt tightening system. Preferably, the fixed engagement member consists of a part of the frame having an opening provided with inner teeth defined therein, and the moveable engagement member consists of a gear member having outer teeth and received in the opening so as to be rotatable therein without being interfered by the inner teeth in inoperative condition of the clamping means.

Thus, when the winding torque acting upon the winding spool is removed, the tension from the webbing brings the outer ratchet teeth and the inner ratchet teeth into meshing engagement and positively restrains the reverse rotation of the ratchet wheel. The ratchet wheel may be normally kept in its inoperative state by a breakable member which is adapted to be broken by the activation of the seat belt tightening means.

BRIEF DESCRIPTION OF THE DRAWINGS

Now the present invention is described in the following in terms of a specific embodiment thereof with reference made to the appended drawings, in which:

FIGS. 9 through 12 are schematic side views of the deceleration sensor for explaining the operation of the deceleration sensor;

FIG. 13 is a sectional side view taken along line XIII—XIII of FIG. 2;

FIGS. 14 through 16 are views similar to FIG. 13 showing the process of taking up slack from the seat belt with the seat belt tightening unit; and FIGS. 17 through 19 are schematic side views showing the operation of the device for preventing the reverse rotation of the seat belt tightening unit.

DESCRIPTION OF THE PREFERRED EMBODIMENT

Figure 1:
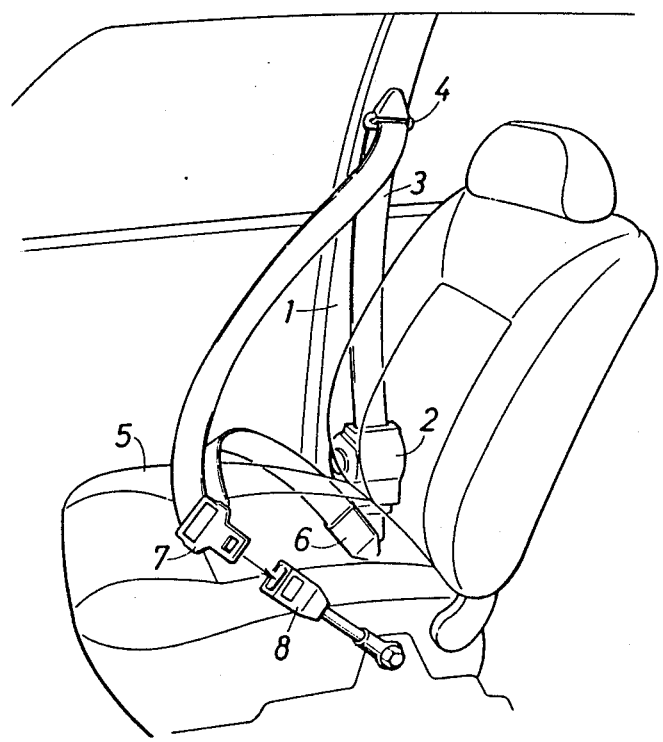
FIG. 1 is an overall perspective view of a seat belt system to which to which the present invention is applied.

FIG. 1 shows the structure surrounding a seat belt system to which the present invention is applied, and the seat belt 3 extending upwardly from a webbing retractor 2 fixedly attached to a lower part of a center pillar 1 of a passenger compartment is passed through a through ring 4 attached to an upper part of the center pillar 1, and passed downward therefrom. The free end portion 6 of the seat belt 3 is attached to a rear part of a side portion of the seat 5. A tongue plate 7 is provided in the part of the seat belt 3 extending between the through ring 4 and the end portion 6 so as to be slidable along the seat belt 3.

When the vehicle occupant seated in the seat 5 pulls the seat belt 3 out of the webbing retractor 2 and engages the tongue plate 7 with a buckle 8 provided on the side of the seat 5 opposite to the anchor point of the end portion 6 of the seat belt 3, the seat belt 3 will be passed over the shoulder, chest and waist of the vehicle occupant.

Figure 2:
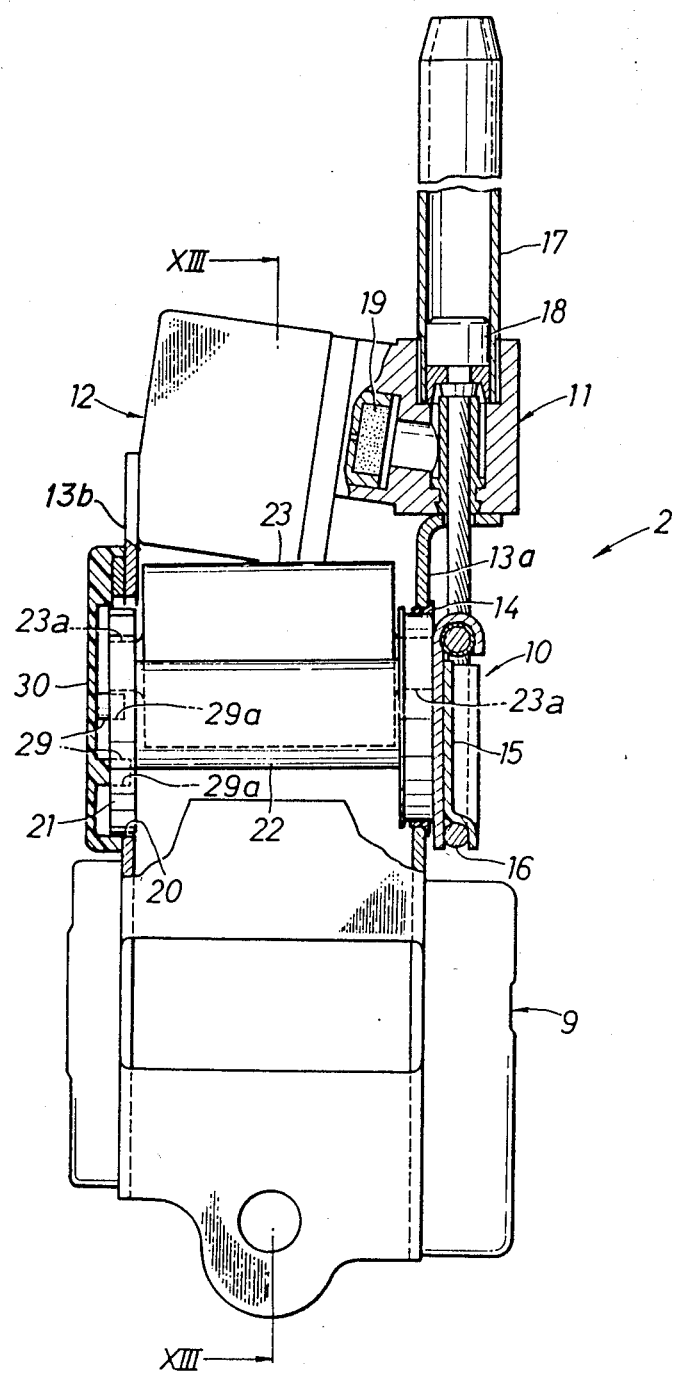
FIG. 2 is a partly broke away from view of the seat belt tightening system according to the present invention.
Figure 3:
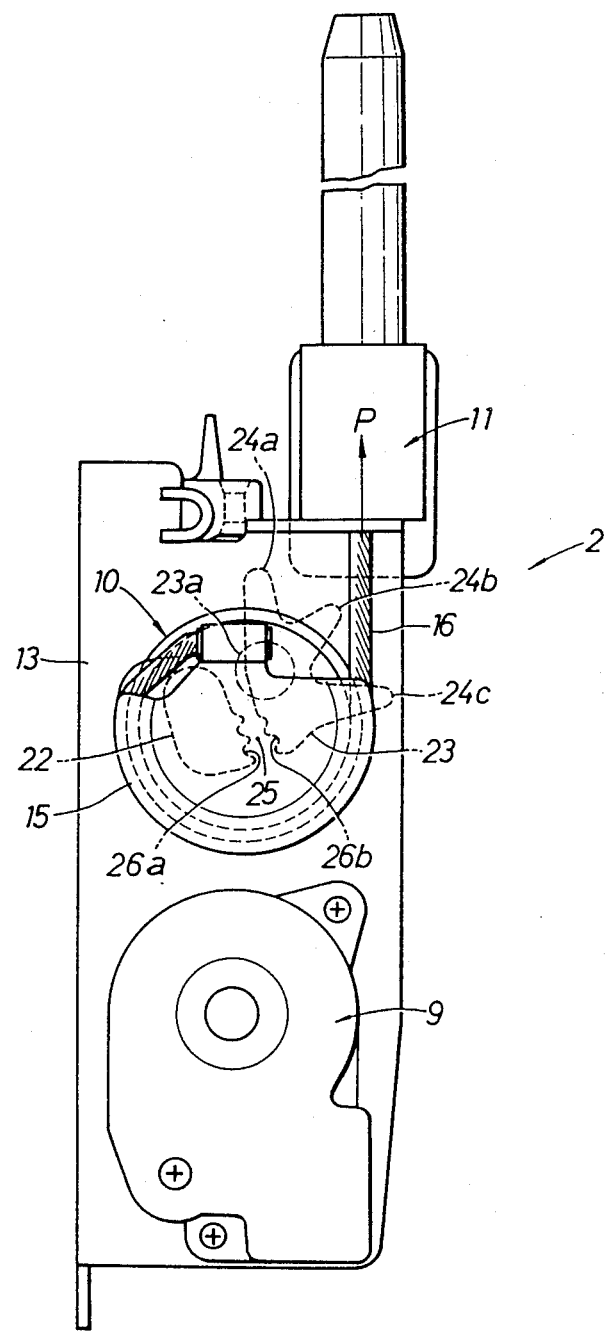
FIGS. 3 and 4 are right and left side views of the seat belt tightening system shown in FIG. 2.
Figure 4:
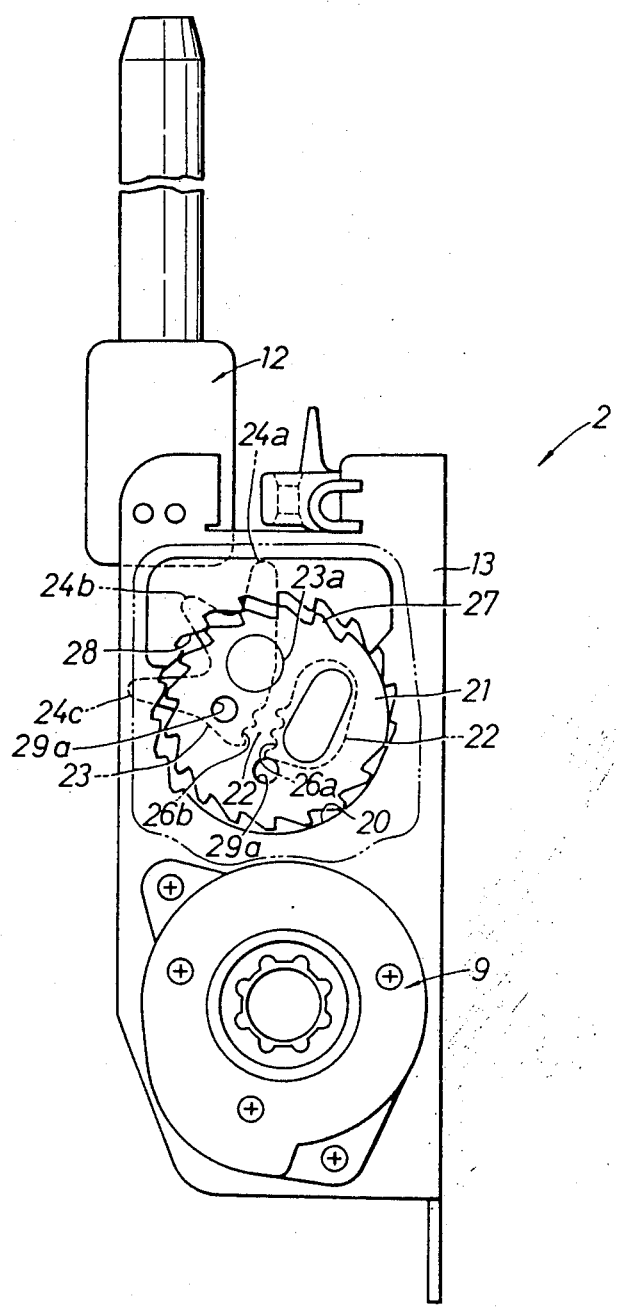

As shown in FIGS. 2 through 4, the webbing retractor 2 is provided with an ELR unit 9 for permitting the pay-out and take-up of the seat belt 3 under normal condition, a seat belt tightening unit 10 for removing slack from the seat belt 3 in case of a vehicle crash, a drive unit 11 for supplying rotational power to the seat belt tightening unit 10, and a deceleration sensor 12 for detecting the occurrence of a vehicle crash.

The ELR unit 9 imparts a rotational force to the webbing winding spool for winding the seat belt 3 thereon by means of a spring incorporated therein in the same way as a conventional ELR device, and, in particular in case of a sudden deceleration, prevents the pay-out of the seat belt 3 by means of a conventional inertia locking mechanism not shown in the drawings.

The casing 13 of the seat belt tightening unit 10 is made by bending metallic plate, and one of its mutually opposing side walls 13a rotatably supports a pulley 15 via a journal bearing 14 consisting of a synthetic resin having a self-lubricating property. A wire 16 is passed around this pulley 15, and one of the ends of the wire 16 is connected to the drive unit 11 while the other end thereof is connected to a suitable location of the pulley 15.

The drive unit 11 comprises a cylinder 17 extending in a tangential direction with respect to the pulley 15, a piston 18 slidably received in the cylinder 17, and a propellant 19 accommodated in the base end of the cylinder 17 for applying a propelling force to the piston 18 when ignited, and is securely attached to the upper end of the casing 13 of the seat belt tightening unit 10. And, by the action of the deceleration sensor 12 integrally incorporated in the base end of the cylinder 17, the propellant 19 is ignited for explosion, and the resulting combustion pressure causes the piston 18 to be pushed through the cylinder 17 and the wire 16 to be drivingly pulled, thereby drivingly rotating the pulley 15.

The other side wall 13b of the casing 13 is provided with an opening 20 for receiving a ratchet wheel 21 so as to be rotatable therein without any interference as described hereinafter. A fixed clamp member 22 having an elliptic cross section is interposed between the opposing surfaces of the pulley 15 and the ratchet wheel 21 so as to extend between the two opposing side walls 13a and 13b and so as to be slightly displaced from the center of the pulley 15. Further, a moveable clamp member 23 is rotatably interposed between the pulley 15 and the ratchet wheel 21 by way of a pivot shaft 23a so as to oppose the fixed clamp member 22. Thus, the assembly consisting of the ratchet wheel 21, the clamp members 22 and 23, and the pulley 15 is rotatably supported by the journal bearing 14 in the manner of a cantilever. The external side surface of the ratchet wheel 21 is covered by a resin cover 30 having a pair of projections 29 fitted into corresponding openings 29a provided in the ratchet wheel 21. The moveable clamp member 23 is provided with three ridges 24a, 24b and 24c projecting radially from the center of the pivot shaft 23a thereof and extending laterally between the opposing two walls 13a and 13b. Each of these ridges 24a, 24b and 24c has a length along the axial direction corresponding to the width of the seat belt 3.

In initial condition, a gap 25 (FIG. 3) is defined between the opposing surfaces of the fixed and moveable clamp members 22 and 23 so as to define a vertical slot through which the seat belt not shown in the drawing can pass freely. Further, the opposing surfaces of the clamp members 22 and 23 at the ELR unit end of the gap 25 are provided with a plurality of axial clamp grooves 26a and 26b extending the entire axial length thereof in a substantially complementary fashion relative to each other.

As shown in FIG. 4, three quarters of the outer periphery of the ratchet wheel 21 is provided with sawtooth shaped outer ratchet teeth 27 which are inclined rearwardly as seen along the direction of normal rotation thereof. Five eighths of the inner periphery of the opening 20 is provided with inner ratchet teeth 28 which are complementary to the outer ratchet teeth 27. The inner and outer diameters of the opening 20 and the ratchet wheel 21 are determined in such a manner that the ratchet wheel 21 may rotate relative to the opening 20 with the tips of the outer ratchet teeth 27 and the inner ratchet teeth 28 barely contacting each other or entirely out of contact with each other when the ratchet wheel 21 is placed coaxially with the opening 20.

Figure 5:
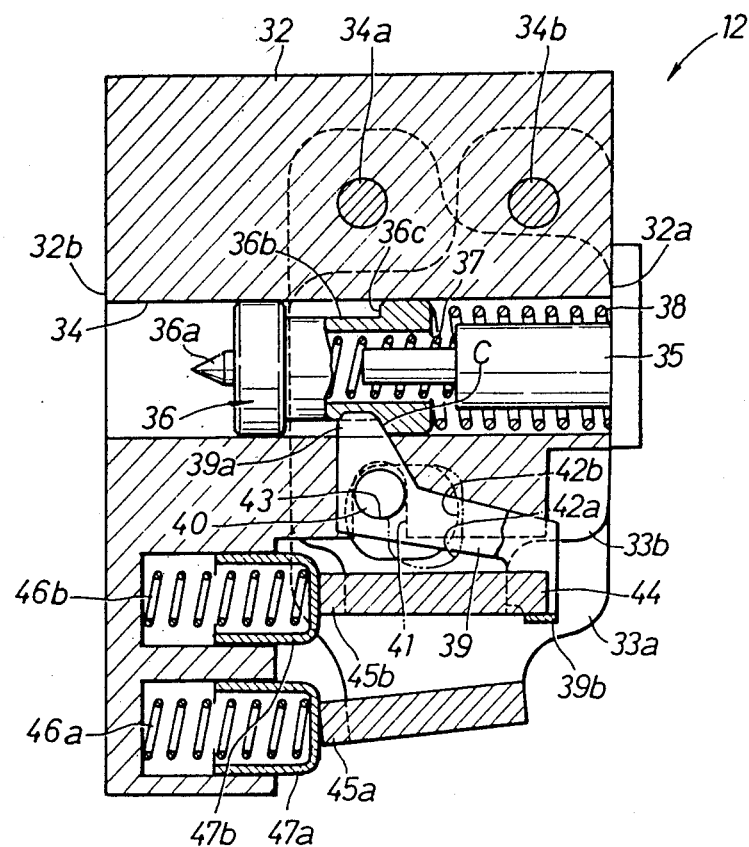
FIG. 5 is a sectional side view of an embodiment of the deceleration sensor.
Figure 6:
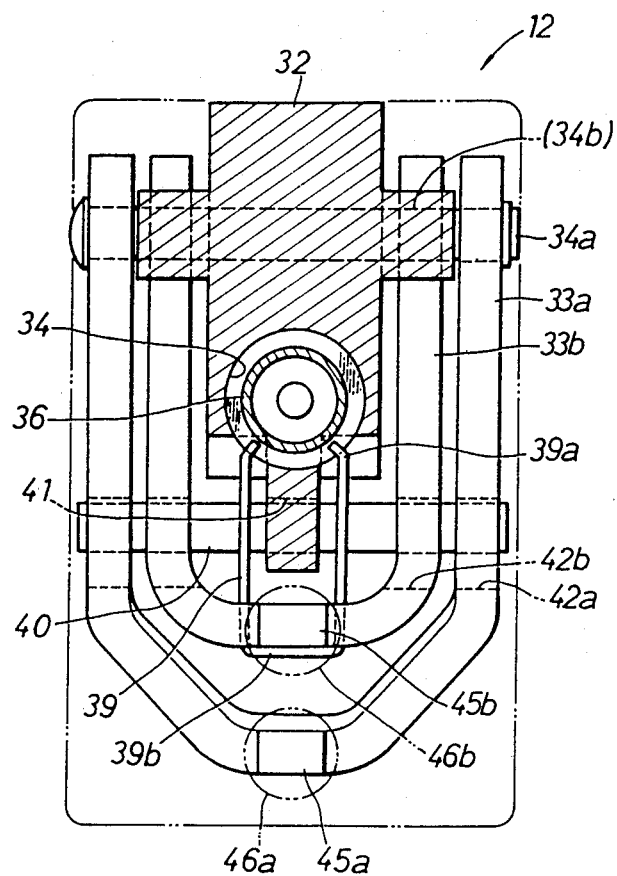
FIG. 6 is a sectional front view of the deceleration sensor.

FIGS. 5 and 6 show the deceleration sensor 12 in greater detail.

A pair of pendulums 33a and 33b serving as sensor masses are suspended at their upper ends from either side of a sensor body 32 of the deceleration sensor 12. These two pendulums 33a and 33b have U-shaped cross sections having open tops. Further, one of them is received by the other, and they are pivotally supported by individual pivot shafts 34a and 34b, which are parallel to each other, so as not to interfere with one another and to swing individually.

An intermediate part of the sensor body 32 interposed between the two pendulums 33a and 33b is provided with a cylindrical guide hole 34 so as to communicate the two end surfaces 32a and 32b of the sensor body along the tangential direction of the swinging motion of the pendulums 33a and 33b. The guide hole 34 is provided with a spring retainer 35 at the opening adjoining one of the end surfaces 32a.

The guide hole 34 receives therein a firing pin 36 for igniting the fuse of the propellant 19. This firing pin 36 comprises a pointed tip 36a, and a plunger 36b which consists of a hollow cylindrical body having an open rear end and slidably received in the guide hole 34. This firing pin 36 is normally biased toward the opening adjoining the other end surface 32b of the sensor body 32 by a pair of coil springs 37 and 38; one of the coil springs 37 having a smaller diameter is interposed between an internal part of the plunger 36b and an annular shoulder surface of a cylindrical part of the spring retainer 35 while the other coil spring 38 is interposed between the end surface of the plunger 36b and an end plate portion of the spring retainer 38.

Figure 7:
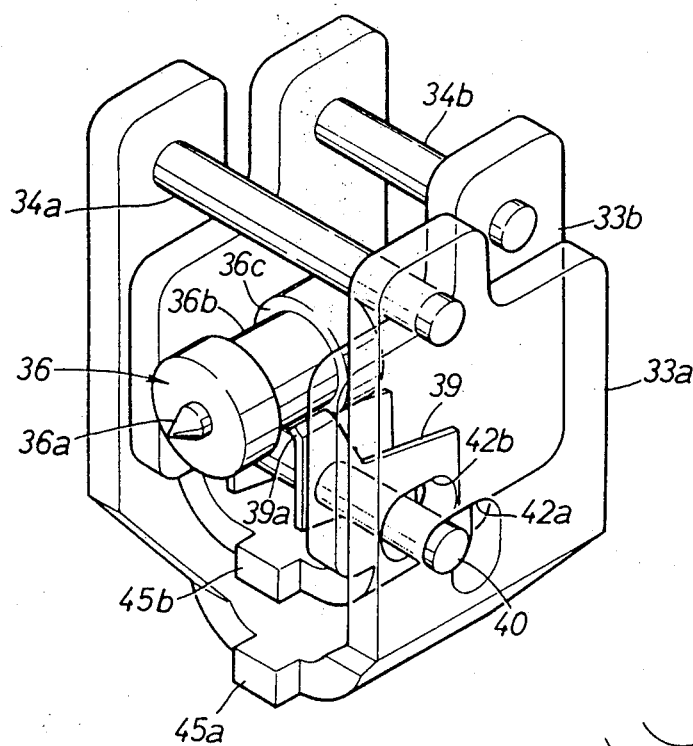
FIGS. 7 and 8 are see through views showing essential parts of the deceleration sensor.

Further referring to FIG. 7, a trigger arm 39 which is bifurcated from a common rear end 39b into a pair of arm parts is pivotally supported by way of a support shaft 40 which rests upon a shoulder surface 43 of an L-shaped opening 42a provided in each side portion of the outer pendulum 33a. The support shaft 40 is also passed through a vertical slot 41 provided in the sensor body 32 and a relatively large rectangular opening 42b provided in each side portion of the inner pendulum 33b. This trigger arm 39 is crank-shaped as seen from a side (FIG. 5) and U-shaped as seen from the front (FIG. 6) so that the upper open ends 39a of the two arm parts thereof project into the guide hole 34 and engage with an annular shoulder surface 36c provided in the plunger 36b of the firing pin 36.

Thus, since the support shaft 40 can move only in the vertical direction guided by the vertical slot 41 of the sensor body 32 but such a vertical displacement of the support shaft 40 is restricted by the shoulder surface 43 of the L-shaped opening 42a provided in each side portion of the outer pendulum 33a, the trigger arm 39 can only pivot around the support shaft 40. On the other hand, the larger opening 42b provided in each side portion of the inner pendulum 33b does not interfere with the movement of the support shaft 40. However, if the pendulum 33a is moved forward, the support shaft 40 is disengaged from the shoulder surfaces 43 of the openings 42a and can drop downwardly therefrom.

Figure 8:
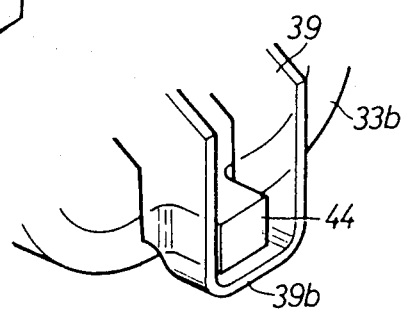

As best shown in FIG. 8, the rear edge of the bottom portion of the inner pendulum 33b is provided with a projection 44 for engaging with the bottom part of a U-shaped rear end 39b of the trigger arm 39. However, if the inner pendulum 33b is moved forward, the rear end 39b of the trigger arm 39 is disengaged from the projection 44, and the trigger arm 39 can rotate around the support shaft 40.

The trigger arm 39 keeps the firing pin 36 stationary in spite of the biasing force of the first and second coil springs 37 and 38 by engaging the free ends 39a of the two arm parts thereof with the annular shoulder surface 36c of the firing pin 36 with the support shaft 40 engaged with the shoulder surfaces 43 of the openings 42a of the outer pendulum 33a and the U-shaped rear end 39b of the trigger arm 39 engaged with the projection 44 of the inner pendulum 33b.

The front edges of the bottom portions of the pendulums 33a and 33b are provided with projections 45a and 45b, respectively. Inside the part of the sensor body 32 opposing these projections 45a and 45b are received biasing springs 46a and 46b which are oriented in parallel with the axial direction of the guide hole 34. These biasing springs 46a and 46b abut the projections 45a and 45b of the pendulums 33a and 33b via guide caps 47a and 47b, whereby the pendulums 33a and 33b are normally urged rearwardly. In this way, the engagement between the rear projections 44 of the inner pendulum 33b and the U-shaped rear end 39b of the trigger arm 39, and the engagement between the shoulder surfaces 43 of the outer pendulum 33a and the pivot shaft 40 of the trigger arm 39 are normally maintained.

Now the operation of the above described embodiment is described in the following with reference to FIGS. 9 through 19.

Under normal running condition of the vehicle, it is so arranged that the biasing forces of the biasing springs 46a and 46b acting upon the pendulums 33a and 33b of the deceleration sensor 12 are more dominant than the inertia forces acting upon the respective pendulums 33a and 33b, and, since the rotation of the trigger arm 39 is prevented by the engagement between the support shaft 40 and the shoulder surfaces 43 of the outer pendulum 33a and the engagement between the rear end 39b of the trigger arm 39 and the projection 44 of the inner pendulum 33b, the firing pin 36 is prevented from moving by the open free ends 39a of the two arm parts of the trigger arm 39 as shown in FIGS. 9 and 11.

Meanwhile, the seat belt tightening unit 10 is normally in the state shown in FIG. 13, and the pay out and the take up of the seat belt 3 can be made freely through the gap 25 defined between the fixed clamp member 22 and the moveable clamp member 23. In order to maintain this state, the projections 29 provided in the resin cover 30 of the ratchet wheel 21 are fitted into the corresponding holes 29a provided in the ratchet wheel 21. These projections 29 are adapted to be easily broken by the torque produced by the drive unit 11 when the latter is activated.

When an acceleration or deceleration in excess of a prescribed level is produced as a result of a vehicle crash, the resulting inertia force causes the pendulums 33a and 33b of the deceleration sensor 12 to be rocked forwardly against the biasing force of the biasing springs 46a and 46b. As a result, the U-shaped rear end 39b of the trigger arm 39 is disengaged from the projection 44 of the inner pendulum 33b. It then follows that the restraint acting upon the firing pin 36 is removed, and the elastic force given from the first and second coil springs 37 and 38 causes the firing pin 36 to be shot forward against the fuse F after displacing the open free ends 39a of the arm parts of the trigger arm 39 out of the way (FIG. 12).

Figure 10:
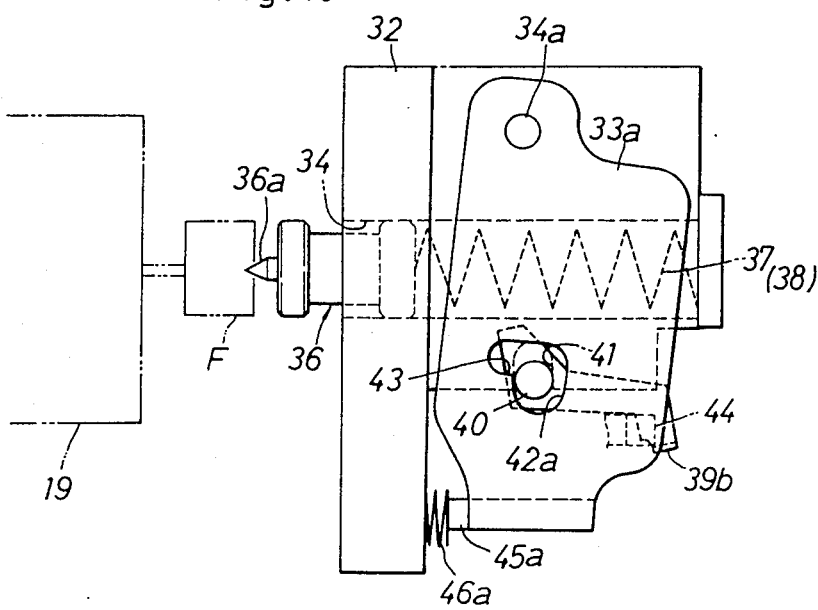

Alternatively, when the support shaft 40 of the trigger arm 39 is disengaged from the shoulder surfaces 43 of the outer pendulum 33a, the open free ends 39a of the arm parts of the trigger arm 39, along with the support shaft 40, drop downward, and the restraint upon the firing pin 36 is removed in the same way as described above with the result that the firing pin 36 is shot forward by the elastic force of the first and second coil springs 37 and 38 against the fuse F after displacing the open ends 39a of the arm parts of the trigger arm 39 out of the way (FIG. 10).

In this way, if either one of the pendulums 33a and 33b rotates due to the inertia forces acting upon them, the firing pin 36 is activated.

When the pointed tip 36a of the firing pin 36 strikes the fuse F, the propellant 19 is ignited, and the resulting explosive increase in pressure pushes up the piston 18. When the piston 18 is thus driven, the wire 16 is pulled in the direction indicated by the arrow P in FIG. 3, and the pulley 15, along with the ratchet wheel 21, is rotated in the direction indicated by the arrow B in FIG. 14.

Thereby, the ridge 24a of the moveable clamp member 23 abuts the seat belt 3. It then follows that the moveable clamp member 23 rotates in the direction indicated by the arrow C by being pressed by the seat belt 3 until the seat belt 3 is firmly wedged between the clamp grooves 26a and 26b as shown in FIG. 15.

Further rotation of the pulley 15 and the moveable clamp member 23 causes the clamp member 23 to act as a lever having a fulcrum at its rotary shaft 23a and its point of application of force at the end portion of the ridge 24a thereby further urging the clamp grooves 26b against the corresponding clamp grooves 26a of the fixed clamp member 22, whereby the seat belt 3 is pulled in the direction indicated by the arrow D as shown in FIG. 16.

During this process, due to the reaction force acting upon the clamp members 22 and 23, the ratchet wheel 21 tends to be pulled downward and the projections 29 are broken. However, because the sawtooth shaped ratchet teeth 27 and 28 of the opening 20 and the ratchet wheel 21 are so selected that the outer ratchet teeth 27 and the inner ratchet teeth 28 can slip relative to each other thereby permitting the seat belt tightening unit 10 to rotate in the direction to take up slack from the seat belt 3. In particular, since the initial contact between the peripheral edges of the opening 20 and the ratchet wheel 21 takes place at the smooth parts of the edges where no teeth are formed, the initial rotational motion of the ratchet wheel 21 immediately after breakage of the projections 26 can be started substantially without obstruction. This is advantageous in ensuring the quick response of the seat belt tightening unit 10.

The further the wire 16 is pulled, the more the seat belt 3 is drawn by the ridges 24a and 24b of the fixed clamp member 22 (FIG. 16).

When the wire 16 is substantially completely pulled in, and the rotational torque acting upon the pulley 15 and the ratchet wheel 21 disappears, the torque arising from the tension of the seat belt 3 starts acting upon the ratchet wheel 21 so as to pull it upwardly and rotate it in the reverse direction (FIG. 17). Thus, the inner ratchet tooth 28T located substantially at the top is engaged by the most adjacent outer ratchet tooth 28T. As a result, a rotational moment M acts upon the ratchet wheel 21 around the point of first engagement 27T and 28T (FIG. 18). Thus, as shown in FIG. 19, the outer ratchet teeth 27 in the region E located ahead of the above mentioned point are brought into meshing engagement with the corresponding inner ratchet teeth 27 so as to positively prevent the reverse rotation of the seat belt tightening unit 10.

Thus, according to the present invention, it is made possible to lock and pull the part of the seat belt paid out from the ELR unit without regards to the internal state of the ELR unit, and any slack in the useful part of the seat belt may be positively removed without being hindered by the action of wrapping the seat belt tightly around a winding spool within the ELR unit. Furthermore, since a thrust is produced by applying the explosive pressure of a propellant upon a piston received in a cylinder, and this liner displacement of the piston is converted into a rotary force of a moveable clamp member by way of a wire and a pulley, the expansion of the propellant can be transmitted to the seat belt tightening unit in a highly efficient manner due to this advantageous structure. Therefore, it is possible to achieve a large stroke take up action of the seat belt using a small power output and a limited space.

Additionally, by mounting the ELR unit and the seat belt tightening unit adjacent to each other on a common casing, and integrally forming the drive unit and the crash detecting unit thereto, the line of signal transmission from the crash detection unit to the drive device and then to the seat belt tightening unit may be simplified, whereby both compact design and high operation reliability of the system can be accomplished.

What we claim is:

1. A vehicle seat belt tightening system for taking up slack from a seat belt in high acceleration or deceleration condition to positively restrain a vehicle occupant but otherwise permitting said seat belt to be paid out to accommodate a movement of said vehicle occupant, comprising:

retractor means having a frame and a winding spool pivotally mounted thereon for winding a seat belt thereon;

said winding spool of said retractor means having a spring-loaded winding spool;

seat belt tightening means integrally attached to said frame at a seat belt outlet end of said retractor means, and provided with clamping means for selectively engaging said seat belt and guide means for guiding a movement of said clamping means in a direction to take up slack from said seat belt;

said guide means comprising a journal bearing for supporting said clamping means for rotational motion around a center line which extends in parallel with the rotational center line of said winding spool;

drive means integrally attached to said frame adjacent said seat belt tightening means for selectively activating said seat belt tightening means; and deceleration detecting means integrally attached to said frame adjacent said drive means for activating said drive means when a level of acceleration or deceleration of a vehicle crash is detected.

2. A vehicle seat belt tightening device according to claim 1, wherein said clamping means comprises a base member rotatably supported by said journal bearing, a fixed clamp member fixedly secured to said base member, and a moveable clamp member pivotally attached to said base member around a center line which extends in parallel with the rotational center line of said base member, said clamp members defining a gap for freely passing said seat belt therebetween in an inoperative condition of said clamping means.

3. A vehicle seat belt tightening system according to claim 2, wherein said drive means comprises a tube having an open end and a substantially closed end, a piston received in said tube adjacent said closed end of said tube in a substantially air tight relationship, a propellant interposed between said closed end of said tube and said piston, a fuse for igniting said propellant, a pulley securely attached to said base member in a coaxially relationship, and a cable having an end attached to said piston and another end passed around said pulley.

4. A vehicle seat belt tightening system according to claim 3, wherein said frame comprises a pair of opposing walls for pivotally supporting two lateral ends of said winding spool, said fixed and moveable clamp members being located between said two walls, and said pulley being located externally of one of said walls.

5. A vehicle seat belt tightening system according to claim 4, wherein said deceleration sensor means is provided with a firing pin which is adapted to be struck upon said fuse when a level or acceleration of deceleration indicative of a vehicle crash is detected.

6. A vehicle seat belt tightening system according to claim 1, wherein said clamping means is further provided with ratchet means for preventing rotation of said clamping means in a direction to release said clamping means.

7. A vehicle seat belt tightening system according to claim 6, wherein said ratchet means comprises a fixed engagement member fixedly secured to said frame, a moveable engagement member attached to said base member so as to be moveable in radial direction at least after said clamping means has been brought into its operative condition, said engagement members being provided with teeth which are adapted to be brought into mutual meshing engagement when said moveable engagement member is moved in said radial direction by a tension from the part of said seat belt external to said seat belt tightening system and turned in the direction to pay out said seat belt and which are brought out of engagement when said moveable engagement member is turned in the direction to take up slack from the part of said seat belt external to said seat belt tightening system.

8. A vehicle seat belt tightening system according to claim 7, wherein said fixed engagement member is fixedly secured to said frame by a breakable member which is adapted to be broken upon activation of said clamping means.

9. A vehicle seat belt tightening system according to claim 7, wherein said fixed engagement member consists of a part of said frame having an opening provided with inner teeth defined therein, and said moveable engagement member consists of a gear member having outer teeth and received in said opening so as to be rotatable therein without being interfered by said inner teeth in inoperative condition of said clamping means.

10. A vehicle seat belt tightening system according to claim 9, wherein said frame comprises a pair of opposing walls for pivotally supporting two lateral ends of said winding spool, said fixed and moveable clamp members being located between said two walls and said pulley being located externally of one of said walls while said opening is provided in the other wall.

11. A vehicle seat belt tightening system according to claim 10, wherein said moveable engagement member is fixedly secured to said frame by a breakable member which is adapted to be broken upon activation of said clamping means.

12. A vehicle seat belt tightening system according to claim 10, wherein said inner and outer teeth are sawtooth shaped so as to positively prohibit the rotation of said moveable member in the direction to pay out said seat belt when said inner and outer teeth are in meshing engagement.

13. A vehicle seat belt tightening system according to claim 12, wherein said moveable engagement member can move in any radial direction when said breakable member is broken, and said fixed and moveable engagement members are provided with smooth peripheral edges at which they are brought into mutually contact in an initial stage of the operation of said clamping means.

14. Ratchet means for a vehicle seat belt tightening system using rotary clamp means which comprises a frame, a rotary base member rotatably supported thereto and clamp members carried by said base member, comprising:

a fixed engagement member fixedly secured to said frame, a moveable engagement member attached to said base member so as to be moveable in radial direction at least after said clamping means has been brought into its operative condition, said engagement members being provided with teeth which are adapted to be brought into mutual meshing engagement when said moveable engagement member is moved in said radial direction by a tension applied by a seat belt external to said seat belt tightening system and turned in the direction to pay out said seat belt, and which are brought out of engagement when said moveable engagement member is turned in the direction to take up slack from the part of said seat belt external to said seat belt tightening system.

15. Ratchet means according to claim 14, wherein said fixed engagement member consists of a part of said frame having an opening provided with inner teeth defined therein and said moveable engagement member consists of a gear member having outer teeth and received in said opening so as to be rotatable therein without being interfered by said inner teeth in inoperative condition of said clamping means.

16. Ratchet means according to claim 15, wherein said fixed engagement member is fixedly secured to said frame by a breakable member which is adapted to be broken upon activation of said clamping means.

17. Ratchet means according to claim 16, wherein said inner and outer teeth are sawtooth shaped so as to positively prohibit the rotation of said moveable member in the direction to pay out said seat belt when said inner and outer teeth are in meshing engagement.

18. Ratchet means according to claim 17, wherein said moveable engagement member can move in any radial direction when said breakable member is broken, and said fixed and moveable engagement members are provided with smooth peripheral edges at which they are brought into mutual contact in an initial stage of the operation of said clamping means.

* * * * *